United States Patent [19]

Breton et al.

[11] Patent Number: 5,340,388
[45] Date of Patent: Aug. 23, 1994

[54] INK COMPOSITIONS TREATED WITH ZEOLITES

[75] Inventors: Marcel P. Breton, Mississauga; Bärbel McGibbon, Oakville, both of Canada

[73] Assignee: Xerox Corporation, Stamford, Conn.

[21] Appl. No.: 107,107

[22] Filed: Aug. 16, 1993

[51] Int. Cl.$^5$ .............................. C09D 11/02
[52] U.S. Cl. ................... 106/22 B; 106/22 R
[58] Field of Search ............ 106/22 R, 22 B; 8/438, 8/625, 632

[56] References Cited

U.S. PATENT DOCUMENTS

| | | | |
|---|---|---|---|
| 4,664,815 | 5/1987 | Ozawa et al. | 106/22 B |
| 4,685,968 | 8/1987 | Palmer | 106/22 B |
| 4,698,151 | 10/1987 | Ozawa et al. | 106/22 B |
| 4,732,613 | 3/1988 | Shioya et al. | 106/22 B |
| 4,786,327 | 11/1988 | Werzel et al. | 106/22 |
| 4,802,989 | 2/1989 | Haruta et al. | 106/22 B |
| 4,810,292 | 3/1989 | Palmer et al. | 106/23 |
| 4,867,789 | 9/1989 | Eida et al. | 106/22 B |
| 5,026,425 | 6/1991 | Hindagola et al. | 106/22 |
| 5,096,718 | 12/1991 | Kappele | 106/22 B |

*Primary Examiner*—Helene Klemanski
*Attorney, Agent, or Firm*—Judith L. Byorick

[57] ABSTRACT

Disclosed is a process for preparing an ink composition which comprises treating a dye with a zeolite, followed by admixing the treated dye with an aqueous liquid vehicle to form an ink composition. Alternatively, the process can comprise admixing a dye and an aqueous liquid vehicle to form an ink composition, followed by treating the ink composition with a zeolite. Also disclosed is an ink container comprising (a) an exit opening; (b) an ink storage area; and (c) a zeolite filter situated between the exit opening and the ink storage area. Further disclosed is an ink container comprising (a) an exit opening; (b) an ink storage area; and (c) a zeolite situated within the ink storage area and situated so that it is in contact with ink contained within the ink storage area.

20 Claims, 4 Drawing Sheets

INK COMPOSITIONS TREATED WITH ZEOLITES

BACKGROUND OF THE INVENTION

The present invention is directed to processes for treating ink compositions. More specifically, the present invention is directed to processes for treating ink compositions suitable for ink jet printing to improve the jetting characteristics thereof. One embodiment of the present invention is directed to a process which comprises treating a dye with a zeolite, followed by admixing the treated dye with an aqueous liquid vehicle to form an ink composition. Another embodiment of the present invention is directed to a process which comprises admixing a dye and an aqueous liquid vehicle to form an ink composition, followed by treating the ink composition with a zeolite. Yet another embodiment of the present invention is directed to a process which comprises admixing a dye and an aqueous liquid vehicle to form an ink composition, preparing an ink container having an exit opening and a storage area and having a zeolite filter situated between the exit opening and the storage area, and incorporating the ink composition into the ink container. Still another embodiment of the present invention is directed to an ink container comprising (a) an exit opening; (b) a storage area; and (c) a zeolite filter situated between the exit opening and the storage area. Another embodiment of the present invention is directed to an ink composition prepared by the process which comprises treating a dye with a zeolite, followed by admixing the treated dye with an aqueous liquid vehicle to form an ink composition. Yet another embodiment of the present invention is directed to an ink composition prepared by the process which comprises admixing a dye and an aqueous liquid vehicle to form an ink composition, followed by treating the ink composition with a zeolite.

Ink jet printing systems generally are of two types continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. 4,251,824, U.S. Pat. 4,410,899, U.S. Pat. No. 4,412,224, and U.S. Pat. No. 4,532,530, the disclosures of each of which are totally incorporated herein by reference.

Ink compositions for ink jet printing and treatment processes thereof are known. For example, U.S. Pat. No. 5,026,425 (Hindagoila et al.) discloses inks for ink-jet printing containing Direct Black 168 dye which have improved water resistance when the sodium cations on the dye are replaced with cations selected from the group consisting of ammonium, polyfunctional, and volatile amine cations.

U.S. Pat. No. 4,810,292 (Palmer et al.) discloses an aqueous-based ink composition for use in ink-jet printers. The composition comprises (a) a vehicle of about 5 to 95% water and the balance at least one glycol ether, such as diethylene glycol; (b) a dye, such as Food Black 2, having at least one negatively charged functional group per molecule, present in an amount up to about 10% of the vehicle composition; and (c) a cationic compound selected from the group consisting of alkanol ammonium compounds and cationic amide compounds, present in an amount such that there is at least one molecule of cationic compound for at least one of the negatively charged functional groups on the dye, the pH of the ink composition being maintained in the acidic region below about 7.

U.S. Pat. No. 4,786,327 (Wenzel et al.) discloses a process for reducing the crusting propensity of dyes, complexed with sodium or other cations, used in ink-jet print heads and for improving other properties of such dyes. The process comprises replacing at least a portion of the cations on such dyes with preselected cations, such as those of the alkali metals lithium, potassium, ammonium, and amines. A two-step process may be used, in which the sodium cations first are at least partially replaced with hydrogen cations by passing an aqueous solution of the dye through the hydrogen form of a strong acid ion exchange resin and the hydrogen cations subsequently are at least partially replaced with the preselected cations by neutralizing the hydrogen-containing dye solution with a base which contains the preselected cation species. Alternately, a one-step process, comprising passing the aqueous solution of the dye through an ion-exchange resin pre-loaded with the preselected cations may be employed.

Zeolites are known materials which generally are hydrated aluminosilicates containing hydrogen, oxygen, aluminum, and silicon arranged in an interconnecting lattice structure. The oxide composition of zeolites vary, depending on their desired application, with typical components including $SiO_2$, $Al_2O_3$, CaO, MgO, $TiO_2$, $Na_2O$, $K_2O$, $Fe_2O_3$, MnO, and the like. Zeolites are available in a variety of particle sizes, typically ranging from about 40 microns to millimeters in diameter.

One difficulty frequently encountered with thermal ink jet printing processes is kogation. Kogation refers to the formation of a solid deposit on the surface of the thermal ink jet printhead heater surface, frequently caused by thermal breakdown of the ink as the liquid ink is heated and vaporized. Eventually, the deposits can build up to a sufficient extent that they begin to act as an insulator between the heater element and the liquid ink, resulting in poor printer performance; examples of specific printing impairment which may occur include an increase in transit time and a reduction in drop ejection velocity, resulting in poor drop placement on the recording substrate, and a reduction in drop volume, resulting in a loss of ink coverage and image quality. Kogation can be associated with the presence in the ink of excess divalent or monovalent cations. These cations can also affect the latency and recoverability of some ink jet inks. Latency is a measure of the period of time at a particular humidity level during which the flow of ink through a nozzle or jet can be stopped from jetting while it contains the ink, and then subsequently restarted without clogging of the nozzle; latency in general should be as high as possible to enable restarting of the ink jet printer after extended idle periods. Many commercially available dyes are supplied at purity levels wherein undesirable levels of ionic materials are present in the dye products. Thus, it may be desirable to purify dye solutions to a very high level of purity to render them suitable for use in thermal ink jet inks. Well known methods of dye treatment, such as reverse osmosis, tend to be very expensive and time consuming, and require special equipment.

Accordingly, while known ink compositions and ink fabrication methods are suitable for their intended purposes, a need remains for improved methods of preparing ink jet inks wherein the dyes therein are purified of excess ionic materials. In addition, there is a need for methods of purifying dye materials and ink compositions which are inexpensive, rapid, and do not require special equipment. Further, a need exists for processes for treating ink compositions for use in ink jet printing wherein the treated ink exhibits reduced kogation. Additionally, there is a need for processes for treating ink compositions for use in ink jet printing wherein the treated ink exhibits improved latency and recoverability. Also, a need remains for processes for treating ink compositions for use in ink jet printing wherein the treated ink exhibits improved shelf life and improved long-term jetting characteristics. There is also a need for methods of treating dye compositions and ink compositions to remove ionic materials wherein the method can be tailored selectively to remove specific ions from the dyes or inks. In addition, there is a need for processes for preparing ink compositions for use in ink jet printing wherein ionic impurities introduced into the ink subsequent to purification of the dye can be removed.

SUMMARY OF THE INVENTION

It is an object of the present invention to provide processes for preparing dye compositions and ink compositions with the above noted advantages.

It is another object of the present invention to provide improved methods of preparing ink jet inks wherein the dyes therein are purified of excess ionic materials.

It is yet another object of the present invention to provide methods of purifying dye materials and ink compositions which are inexpensive, rapid, and do not require special equipment.

It is still another object of the present invention to provide processes for treating ink compositions for use in ink jet printing wherein the treated ink exhibits reduced kogation.

Another object of the present invention is to provide processes for treating ink compositions for use in ink jet printing wherein the treated ink exhibits improved latency and recoverability.

Yet another object of the present invention is to provide processes for treating ink compositions for use in ink jet printing wherein the treated ink exhibits improved shelf life and improved long-term jetting characteristics.

Still another object of the present invention is to provide methods of treating dye compositions and ink compositions to remove ionic materials wherein the method can be tailored selectively to remove specific ions from the dyes or inks.

It is another object of the present invention to provide processes for preparing ink compositions for use in ink jet printing wherein ionic impurities introduced into the ink subsequent to purification of the dye can be removed.

These and other objects of the present invention (or specific embodiments thereof) can be achieved by providing a process which comprises treating a dye with a zeolite, followed by admixing the treated dye with an aqueous liquid vehicle to form an ink composition. Another embodiment of the present invention is directed to a process which comprises admixing a dye and an aqueous liquid vehicle to form an ink composition, followed by treating the ink composition with a zeolite. Yet another embodiment of the present invention is directed to a process which comprises admixing a dye and an aqueous liquid vehicle to form an ink composition, preparing an ink container having an exit opening and a storage area and having a zeolite filter situated between the exit opening and the storage area, and incorporating the ink composition into the ink container. Still another embodiment of the present invention is directed to an ink container comprising (a) an exit opening; (b) a storage area; and (c) a zeolite filter situated between the exit opening and the storage area. Another embodiment of the present invention is directed to an ink composition prepared by the process which comprises treating a dye with a zeolite, followed by admixing the treated dye with an aqueous liquid vehicle to form an ink composition. Yet another embodiment of the present invention is directed to an ink composition prepared by the process which comprises admixing a dye and an aqueous liquid vehicle to form an ink composition, followed by treating the ink composition with a zeolite.

BRIEF DESCRIPTION OF THE DRAWINGS

Illustrated schematically in FIG. 1 is one embodiment of an ink cartridge of the present invention, wherein a zeolite filter is situated at the ink supply opening.

Illustrated schematically in FIG. 2 is another embodiment of an ink cartridge of the present invention, wherein a zeolite is contained within the ink supply chamber.

Illustrated schematically in FIG. 3 is yet another embodiment of an ink cartridge of the present invention, wherein at least one wall of the ink supply chamber is lined with a zeolite material.

Illustrated schematically in FIG. 4 is still another embodiment of an ink cartridge of the present invention, wherein a zeolite is contained within a column within the ink supply chamber.

DETAILED DESCRIPTION OF THE INVENTION

Ink compositions prepared according to the present invention generally comprise an aqueous liquid vehicle, a dye or mixture of dyes, and optional additional additive components. The liquid vehicle may consist of water, or it may comprise a mixture of water and a miscible organic component, such as ethylene glycol, propylene glycol, diethylene glycol, glycerine, dipropylene glycol, polyethylene glycol, polypropylene glycol, amides, ethers, carboxylic acids, esters, alcohols, organosulfides, organosulfoxides, sulfones, including sulfolane, alcohol derivatives, carbitol, butyl carbitol, cellusolve, ether derivatives, amino alcohols, ketones, N-methylpyrrolidinone, 2-pyrrolidinone, cyclohexylpyrrolidone, hydroxyethers, amides, sulfoxides, lactones, and other water miscible materials, as well as mixtures thereof. When mixtures of water and water miscible organic liquids are selected as the liquid vehicle, the water to organic ratio may be in any effective range, and typically is from about 100:0 to about 30:70, preferably from about 97:3 to about 50:50, although the ratio can be outside this range. The non-water component of the liquid vehicle generally serves as a humectant or a penetrant which has a boiling point higher than that of water (100° C.). The liquid vehicle (comprising water plus humectant) is typically present in an amount of from about 60 to about 99.5 percent by weight of the ink, and preferably from about 75 to about 99 percent by weight of the ink, although the amount can be outside of this range.

The ink compositions also contain a colorant, which typically is a dye. Examples of suitable dyes include reactive dyes, direct dyes, anionic dyes, acid dyes, food dyes, and the like. Specific examples of suitable dyes include Bernacid Red 2BMN, Pontamine Brilliant Bond Blue A, BASF Basacid Black, Pontamine, Food Black 2, Carodirect Turquoise FBL Supra Conc. (Direct Blue 199), available from Carolina Color and Chemical, Special Fast Turquoise 8GL Liquid (Direct Blue 86), available from Mobay Chemical, Intrabond Liquid Turquoise GLL (Direct Blue 86), available from Crompton and Knowles, Cibracron Brilliant Red 38-A (Reactive Red 4), available from Aldrich Chemical, Drimarene Brilliant Red X-2B (Reactive Red 56), available from Pylam, Inc., Levafix Brilliant Red E-4B, available from Mobay Chemical, Levafix Brilliant Red E-6BA, available from Mobay Chemical, Procion Red H8B (Reactive Red 31), available from ICI America, Pylam Certified D&C Red #28 (Acid Red 92), available from Pylam, Direct Brill Pink B Ground Crude, available from Crompton & Knowles, Cartasol Yellow GTF Presscake, available from Sandoz, Inc., Tartrazine Extra Conc. (FD&C Yellow #5, Acid Yellow 23), available from Sandoz, Carodirect Yellow RL (Direct Yellow 86), available from Carolina Color and Chemical, Cartasol Yellow GTF Liquid Special 110, available from Sandoz, Inc., D&C Yellow #10 (Acid Yellow 3), available from Tricon, Yellow Shade 16948, available from Tricon, Basacid Black X34, available from BASF, Carta Black 2GT, available from Sandoz, Inc., Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, available from Bayer, Procion Turquoise PA, Procion Turquoise HA, Procion Turquoise H-5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, available from ICI, Cibacron Red F-B, Cibacron Black BG, Lanasol Black B, Lanasol Red 5B, Lanasol Red B, and Lanasol Yellow 4G, available from

Ciba-Geigy, Basilen Black P-BR, Basilen Yellow EG, Basilen Brilliant Yellow P-3GN, Basilen Yellow M-6GD, Basilen Brilliant Red P-3B, Basilen Scarlet E-2G, Basilen Red E-B, Basilen Red E-7B, Basilen Red M-5B, Basilen Blue E-R, Basilen Brilliant Blue P-3R, Basilen Black P-BR, Basilen Turquoise Blue P-GR, Basilen Turquoise M-2G, Basilen Turquoise E-G, and Basilen Green E-6B, available from BASF, Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, available from Sumitomo Chemical Company, Intracron Yellow C-8G, Intracron Red C-8B, Intracron Turquoise Blue GE, INtracron Turquoise HA, and Intracron Black RL, available from Crompton and Knowles, Dyes and Chemicals Division, and the like. Additional examples include the dyes available from ICI Americas, Inc. of the chemical structure and those of the chemical structure such as dansyl-lysine, N-(2-aminoethyl)-4-amino-3,6-disulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or dinaphthyltriazole derivatives of 4,4'-disubstituted stilbene disulfonic acid, derivatives of benzithiazole, derivatives of benzoxazole, derivatives of benziminazole, derivatives of coumarin, derivatives of pyrazolines containing sulfonic acid groups, 4,4'-bis(triazin-2-ylamino)stilbene-2,2'-disulfonic acids, 2-(stilben-4-yl)naphthotriazoles, 2-(4-phenylstilben-4yl)benzoxazoles, 4,4-bis(triazo-2-yl)stilbene-2,2'-disulfonic acids, 1,4-bis(styryl)biphenyls, 1,3-diphenyl-2-pyrazo-

Dyes that are invisible to the naked eye but detectable when exposed to radiation outside the visible wavelength range (such as ultraviolet or infrared radiation), lines, bis(benzazol-2-yl) derivatives, 3-phenyl-7-(triazin- 2-yl)coumarins, carbostyrils, naphthalimides, 3,7-diaminodibenzothiophen-2,8-disulfonic acid-5,5-dioxide, other commercially available materials, such as C.I. Fluorescent Brightener No. 28 (C.I. 40622), the fluorescent series Leucophor B-302, BMB (C.I. 290), BCR, BS, and the like (available from Leucophor), and the like, are also suitable. The dye is present in the ink composition in any effective amount, typically from about 1 to about 20 percent by weight, and preferably from about 2 to about 10 percent by weight (wherein the amount refers to the amount of dye molecules present in the ink), although the amount can be outside this range. A mixture of dyes in the proportions desired to obtain a specific shade can also be employed.

Other additives can also be present in the inks. For example, one or more surfactants or wetting agents can be added to the ink. These additives may be of the cationic, anionic, or nonionic types. Suitable surfactants and wetting agents include sodium lauryl sulfate, Tamol ® SN, Tamol ® LG, those of the Triton ® series available from Rohm and Haas Company, those of the Marasperse ® series, those of the Igepal ® series available from GAF Company, those of the Tergitol ® series, and other commercially available surfactants. These surfactants and wetting agents are present in effective amounts, generally from 0 to about 15 percent by weight, and preferably from about 0.01 to about 8 percent by weight, although the amount can be outside of this range.

Polymeric additives can also be added to the inks to enhance the viscosity and the stability of the ink. Water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, and the like are typical polymeric additives. Polymeric additives can be present in the ink of the present invention in amounts of from 0 to about 10 percent by weight, and preferably from about 0.01 to about 5 percent by weight, although the amount can be outside this range.

One preferred additive to the inks is a polymeric additive consisting of two polyalkylene oxide chains bound to a central bisphenol-A moiety. This additive is of the formula wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide/bisphenol-A polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, CT, is a suitable polymeric additive for the inks of the present invention. In addition, compounds of the above formula can be prepared by the methods disclosed in Polyethers, N. G. Gaylord, John Wiley & Sons, New York (1963) and "Laboratory Synthesis of Polyethylene Glycol Derivatives," J. M. Harris, J. Molecular Science—Rev. Macromol. Chem. Phys., C25(3), 325–373 (1985), the disclosures of each of which are totally incorporated herein by reference. The polyalkylene oxide/bisphenol-A additive is generally present in the ink in an amount of at least about 1 part per million. Typically, the polyalkylene oxide/bisphenol-A additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

Other optional additives to the inks include biocides such as Dowicil 150,200, and 75, benzoate salts, sorbate salts, and the like, present in an amount of from about 0.0001 to about 4 percent by weight, and preferably from about 0.01 to about 2.0 percent by weight, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, or the like.

The ink compositions are generally of a viscosity suitable for use in thermal ink jet printing processes. Typically, the ink viscosity is no more than about 15 centipoise, and preferably is from about 1 to about 7 centipoise.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by preparing a conventional ink composition according to any desired process, such as by mixing the ingredients, heating if desired, and filtering, followed by introducing any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

Ink compositions can be prepared according to the present invention by treating a dye composition or a series or mixture of dye compositions with one or more zeolites to remove ionic impurities, followed by admixing the purified dye or dyes with the other ink ingredients to form an ink. Alternatively, the ink composition can be prepared by mixing together all desired ingredients, followed by treating the ink with one or more zeolites to remove ionic impurities prior to employing the ink in a printing process.

Zeolites are natural volcanic minerals in the class of hydrated aluminosilicates, and they generally comprise hydrogen, oxygen, aluminum, and silicon arranged in an interconnecting lattice structure. The size of the channels within the lattice structure can vary, and is usually uniform within a given zeolite. Specific zeolites include, for example, hydrated sodium aluminosilicate ($Na_2O.Al_2O_3.2SiO_2.XH_2O$, or $5Na_2O.5Al_2O_3.14SiO_2.XH_2O$) (also called chabazite or herschelite), anhydrous sodium aluminosilicate (also called sodium chabazite or natural herschelite), anhydrous calcium montmorillonite (also called smectite or calcium bentonite), magnesium calcium aluminosilicate (also called bentonite), potassium aluminosilicate (($K_2O.Na_2O).Al_2O_3.2SiO_2.XH_2O$), calcium aluminosilicate ($4CaO.Na_2O.5Al_2O_3.10SiO_2.XH_2O$), and the like. Zeolites are suitable for selectively adsorbing specific gas molecules, and are known for use in odor treatment processes. Zeolites also have the ability to adsorb and desorb water reversibly without undergoing any chemical or physical change. Zeolites are suitable for removing a wide variety of ionic materials from dye solutions or ink compositions according to the processes of the present invention. Examples of ions which can be removed from dyes and inks include $Rb^+$, $Li^+$, $K^+$, $Cs^+$, $NH_4^+$, $Na^+$, $Ag^+$, $Tl^+$, $Cd^{2+}$, $Pb^{2+}$, $Zn^{2+}$, $Ba^{2+}$, $Sr^{2+}$, $Cu^{2+}$, $Ca^{2+}$, $Hg^{2+}$, $Mg^{2+}$, $Fe^{3+}$, $Co^{3+}$, $Al^{3+}$, $Cr^{3+}$, and the like. Zeolites are well known materials and are commercially available from, for example, Steelhead Specialty Minerals, Spokane, Wash. Zeolite materials are also available as VALFOR® from PQ Corporation, Valley Forge, Pa., BAYLITH® from Miles Inc., EZA® from Ethyl Corporation, Baton Rouge, La., CABSORB from GSA Resources, Inc., Cortaro, Ariz., ZEOCHEM® and PURMOL® from Zeochem, Louisville, Ky., various zeolite molecular sieves from Aldrich Chemical Co., Milwaukee, Wis., products available from UPO, Des Plaines, Ill., and the like.

The selectivity of any particular zeolite for specific cations generally is related to the hydrated molecular size and the relative concentration of the cation. For example, natural sodium chabazite (also referred to as herschelite; CABSORB Sodium, a sodium aluminosilicate zeolite available from GSA Resources, Inc., Cortaro, Ariz.), with a cation exchange capacity of 2.37 m.e./g and available from Steelhead Specialty Chemicals, selectively exchanges cations in the following order:

Typically, the ion exchange capacity of the zeolite will increase with increasing surface area available for exchange. Dyes suitable for use in ink jet printing typically can be contaminated with various different cations, depending generally on the process and materials used to synthesize the dye and the water in which the dye is dissolved.

The dyes and/or ink compositions can be treated by the process of the present invention by several suitable methods. For example, the dye or dyes intended for use in the ink or the ink composition itself can be treated with the zeolite by admixing the liquid dye, or, preferably, an aqueous solution of the dye, or the ink, with particles of the zeolite, followed by filtering the liquid to remove the particulate zeolite materials from the ink subsequent to removal of the ionic impurities. The zeolite particles can also be removed from the ink by centrifugation if desired. The dye, dye solution, or ink can be admixed with the zeolite in any suitable relative amounts. Typically, the zeolite is added to the ink in an amount of from about 0.01 to about 5.0 percent by weight of the ink, and preferably from about 0.05 to about 2.0 percent by weight of the ink, although the amount can be outside these ranges. The ink is treated with the zeolite for any effective amount of time. Typically, treatment times of from about 1 minute to about 120 minutes, and more typically from about 10 minutes to about 120 minutes, are sufficient, although the treatment time can be outside these ranges. In some instances exposure times of 1 second may be sufficient. Any effective particle size zeolite can be employed. Typical particle sizes are greater than about 0.8 micron in average diameter, and preferably are greater than about one micron in average diameter; typical particle size ranges are from about 2 to about 10 microns in average diameter, although the particle size can be outside this range. When centrifugation is employed to remove the zeolite particles from the ink, smaller diameter zeolite particles can be employed, such as those 0.4 microns in diameter or less.

In addition, the dye or dyes intended for use in the ink or the ink composition itself can be treated with the zeolite by passing the dye, or an aqueous solution of the dye, or the ink through a filter of the zeolite. Any suitable filter configuration can be employed. For example, the zeolite particles can be packed in a glass column to make an ion exchange column through which the ink is poured. In this embodiment, preferred zeolite materials generally are zeolite beads of from about 0.1 to about 5 millimeters in average diameter, more preferably from about 1 to about 3 millimeters in average diameter, although powder zeolite materials can also be employed. The zeolite particles are retained in the glass column by a support having pores smaller in diameter than the zeolite particles. The amount of zeolite used and the size of the column generally will depend on the type of zeolite employed and the surface area available for ion exchange. For example, Cabsorb SC1502A, which has a surface area of 97 square meters per gram and a packing density of 993 kilograms per cubic meter, can be expected to produce desirable results with an ink composition when used in an amount of about 2 grams of zeolite per 100 grams of ink.

In addition, particles of the zeolite can be pressed onto the surface of a ceramic filter to create a zeolite filter. Further, a filter of the zeolite particles can be made by placing a bed of the zeolite particles onto a supporting mesh of any desired material, such as ceramic, nylon, or the like, wherein the mesh size is sufficiently fine to prevent the zeolite particles from passing through the mesh. If desired, several layers of zeolite particles can be sandwiched between supporting meshes to form a filter.

In one embodiment of the present invention, an ink composition containing a dye colorant is prepared and incorporated into an ink container. The container is incorporated into an ink jet printer and ink is delivered to the printhead for use in printing. A zeolite filter is provided in either the ink container or in the delivery system of the ink jet printing apparatus. When the filter is included in a disposable container, it is disposed of and replaced each time the container is disposed of and replaced; since the zeolite filter can be regenerated, it can be "recycled" and used again in a new ink cartridge. If the cartridge is not disposable and must be refilled, the zeolite filter can be replaced or regenerated periodically to remove collected cations and restore its purifying function.

Ink supply systems for ink jet printers are well known. For example, U.S. Pat. No. 4,571,599, the disclosure of which is totally incorporated herein by reference, illustrates a disposable ink cartridge for ink jet printing. U.S. Pat. No. 5,138,332, the disclosure of which is totally incorporated herein by reference, discloses a printer in which a bag containing ink supplies ink to the cartridge on the printhead. U.S. Pat. No. 4,929,969 and U.S. Pat. No. 5,136,305, the disclosures of each of which are totally incorporated herein by reference, disclose ink-containing cartridges for use in an ink jet printer wherein the cartridge contains a foam. U.S. Pat. No. 4,074,284 and U.S. Pat. No. 4,506,276, the disclosures of each of which are totally incorporated herein by reference, disclose disposable ink sources for ink jet printing wherein the ink sources are collapsible elastic balloons. Any ink container suitable for use in an ink jet printer can be employed for this embodiment of the present invention. The zeolite filter is situated at a location between the main body of ink in the container and the printhead.

Figure 1:
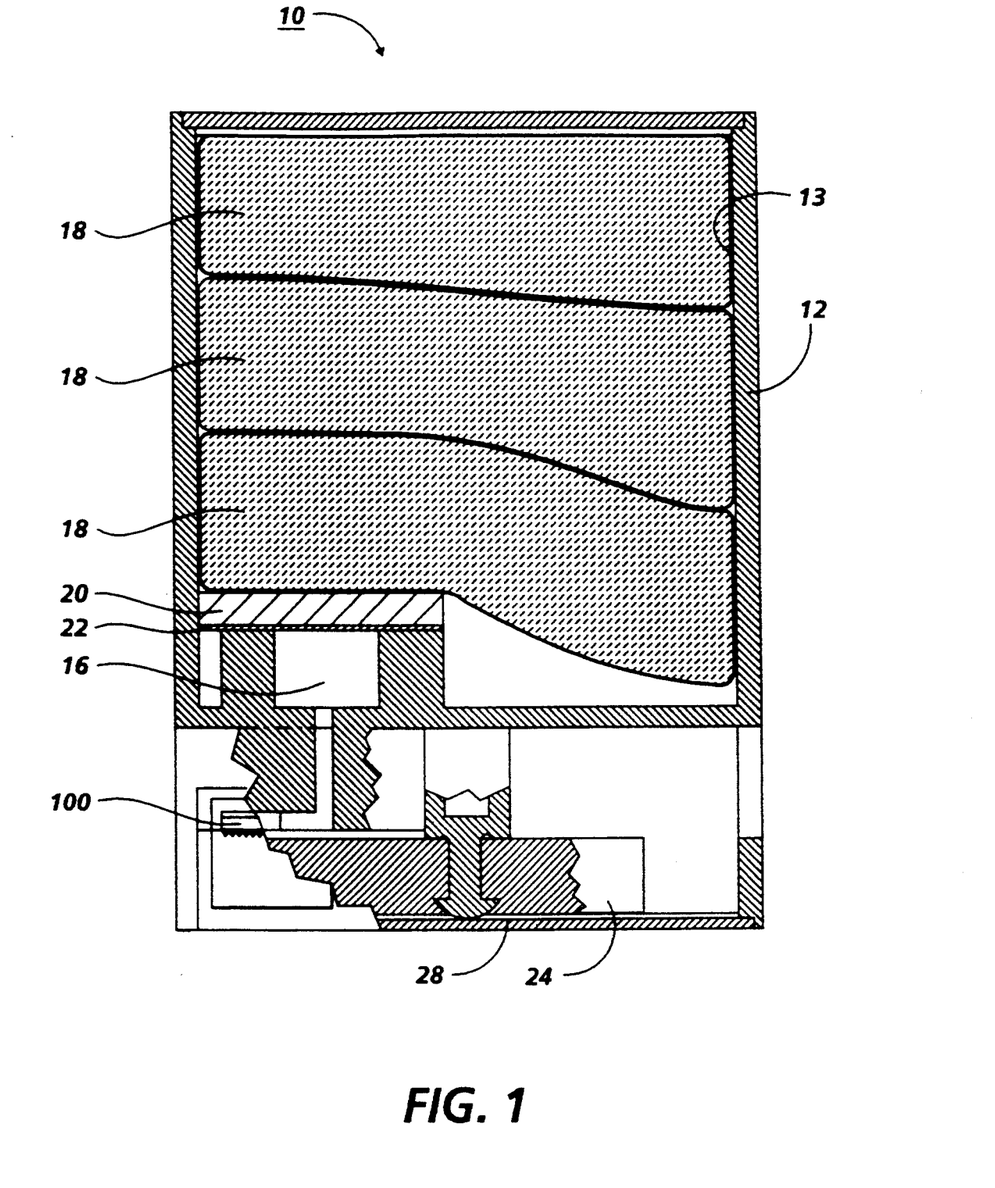

An example of a suitable disposable ink cartridge is illustrated schematically in FIG. 1. As illustrated schematically in FIG. 1, ink cartridge 10 has a main portion in the form of a housing 12. Housing 12 is typically made of a lightweight but durable plastic. Housing 12 defines a chamber 13 for the storage of liquid ink, and an exit opening 16. At the end of the exit opening 16 (as shown at the broken portion of FIG. 1) is an ink jet printhead 100, and specifically the ink supply manifold thereof. Optionally, an ink-saturated medium, shown here as three separate portions each marked 18, can occupy most of the chamber 13 of housing 12. Medium 18 can be of any suitable material, such as cloth, foam, or the like. For example, as disclosed in copending application U.S. Ser. No. 07/885,704, the disclosure of which is totally incorporated herein by reference, medium 18 is in the form of a needled felt of polyester fibers. Needled felt is made of fibers physically interlocked by the action of, for example, a needle loom, although in addition the fibers may be matted together by soaking or steam heating. Preferably, the needled felt is of a density of from about 0.06 to about 0.13 grams per cubic centimeter. It has been found that the optimum density of this polyester needled felt forming medium 18 is about 0.095 grams per cubic centimeter. This optimum density reflects the most advantageous volume efficiency, as described above, for holding liquid ink. A type of felt suitable for this purpose is manufactured by BMP of America, Medina, N.Y. To provide the back pressure of liquid ink within the desired range, while still providing a useful volume efficiency and portability, the polyester fibers forming the needled felt should be of two intermingled types, the first type of polyester fiber being of a greater fineness than the second type of polyester fiber. Specifically, an advantageous composition of needled felt comprises approximately equal proportions of 6 denier and 16 denier polyester fibers. Medium 18 is packed inside the enclosure of housing 12 in such a manner that the felt exerts reasonable contact and compression against the inner walls. In one embodiment of the invention, the medium 18 is created by stacking three layers of needled felt, each one-half inch in thickness, and packing them inside the housing 12. Alternatively (not shown), the ink can be contained within a flexible bag situated inside of housing 12. Any other suitable interior configuration of housing 12 can also be employed.

Other optional parts of the cartridge 10 which are useful in a practical embodiment of the invention include a heat sink 24 and cover 28. A practical design will typically include space for on-board circuitry for selective activation of the heating elements in the printhead 100. If desired, housing 12 can be vented to the air to enhance ink flow from the cartridge.

Further situated between the main storage chamber 13 and exit opening 16 is a zeolite filter, indicated as 20. The zeolite filter can have any desired configuration, such as a filter of ceramic or other material onto which zeolite particles have been placed by pressure or any other suitable means, a sandwich configuration of one or more layers of zeolite particles situated between mesh supports, or the like. Optionally, exit opening 16 can be initially covered by a seal 22. The seal is of a material easily ruptured, such as an aluminum foil seal which is adhesively attached to a periphery of the exit opening. When the seal is broken, ink can exit the storage chamber 13. Preferably, both the ink and the zeolite filter are subject to degassing prior to sealing the cartridge to extend the shelf life of the filter.

Alternatively (not shown), zeolite can be incorporated into the ink cartridge by adding zeolite particles to the ink in the cartridge. In this embodiment, it is preferred that the zeolite particles be of sufficiently small diameter to avoid contamination of the printhead nozzles. In addition, a layer of zeolite particles can be included at the bottom of the cartridge at a level lower than that of the ink inlet, thus enabling ion exchange while minimizing particulate contamination of the printer.

Figure 2:
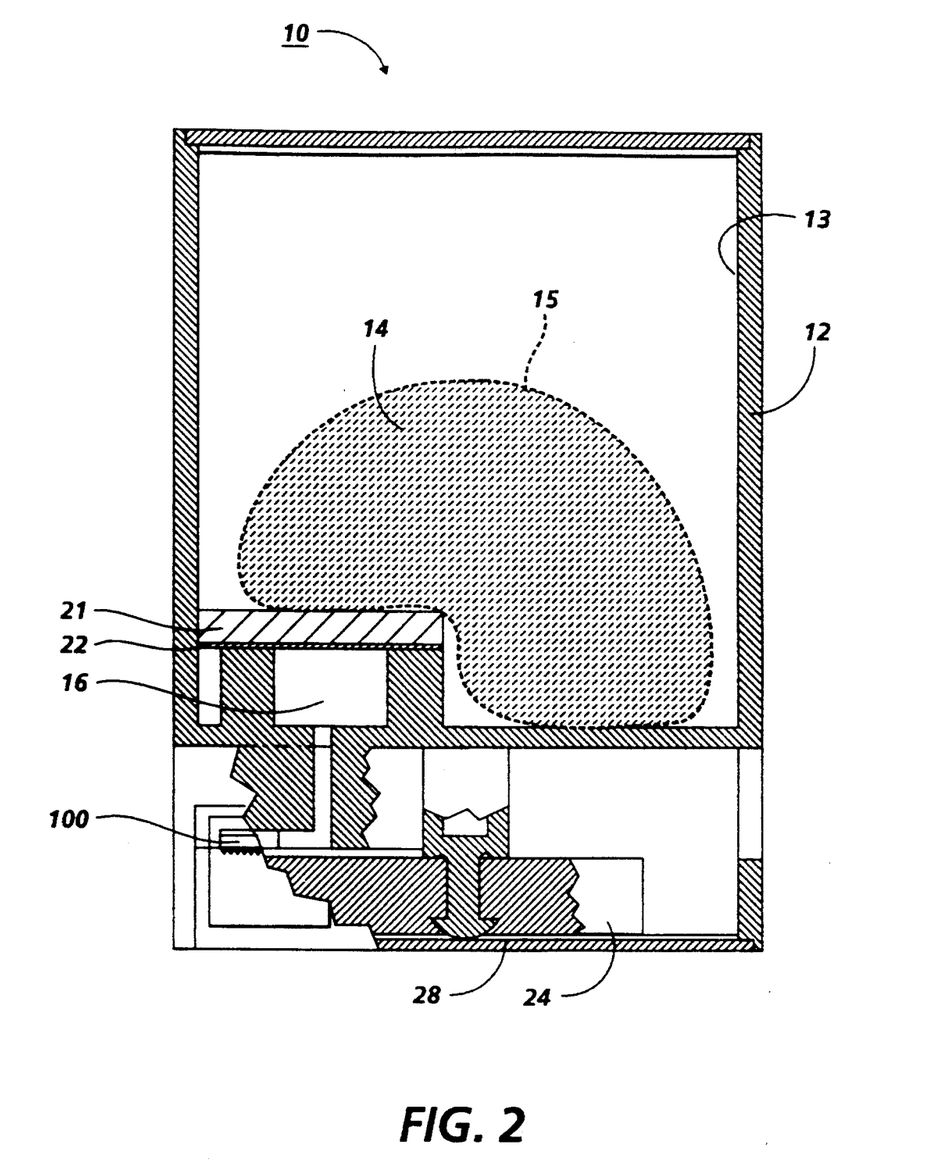

Further, as illustrated schematically in FIG. 2, zeolite can be incorporated into the ink cartridge by adding to the ink in the cartridge a bag of porous plastic or other material containing zeolite particles, wherein the pores in the plastic or other material are smaller than the diameter of the zeolite particles. As shown schematically in FIG. 2, ink cartridge 10 has a main portion in the form of a housing 12. Housing 12 is typically made of a lightweight but durable plastic. Housing 12 defines a chamber 13 for the storage of liquid ink, and an exit opening 16. At the end of the exit opening 16 (as shown at the broken portion of FIG. 2) is an ink jet printhead 100, and specifically the ink supply manifold thereof. Any suitable interior configuration of housing 12 can also be employed. Other optional parts of the cartridge 10 which are useful in a practical embodiment of the invention include a heat sink 24 and cover 28. A practical design will typically include space for on-board circuitry for selective activation of the heating elements in the printhead 100. If desired, housing 12 can be vented to the air to enhance ink flow from the cartridge. Further situated between the main storage chamber 13 and exit opening 16 is an optional filter, indicated as 21, to remove any particulate matter in the ink. Optionally, exit opening 16 can be initially covered by a seal 22. The seal is of a material easily ruptured, such as an aluminum foil seal which is adhesively attached to a periphery of the exit opening. When the seal is broken, ink can exit the storage chamber 13. Contained within chamber 13 is a bag 15 of any suitable porous material such as porous plastic or the like, which contains zeolite particles 14 of a particle diameter larger than the diameter of the pores in bag 15.

Figure 3:
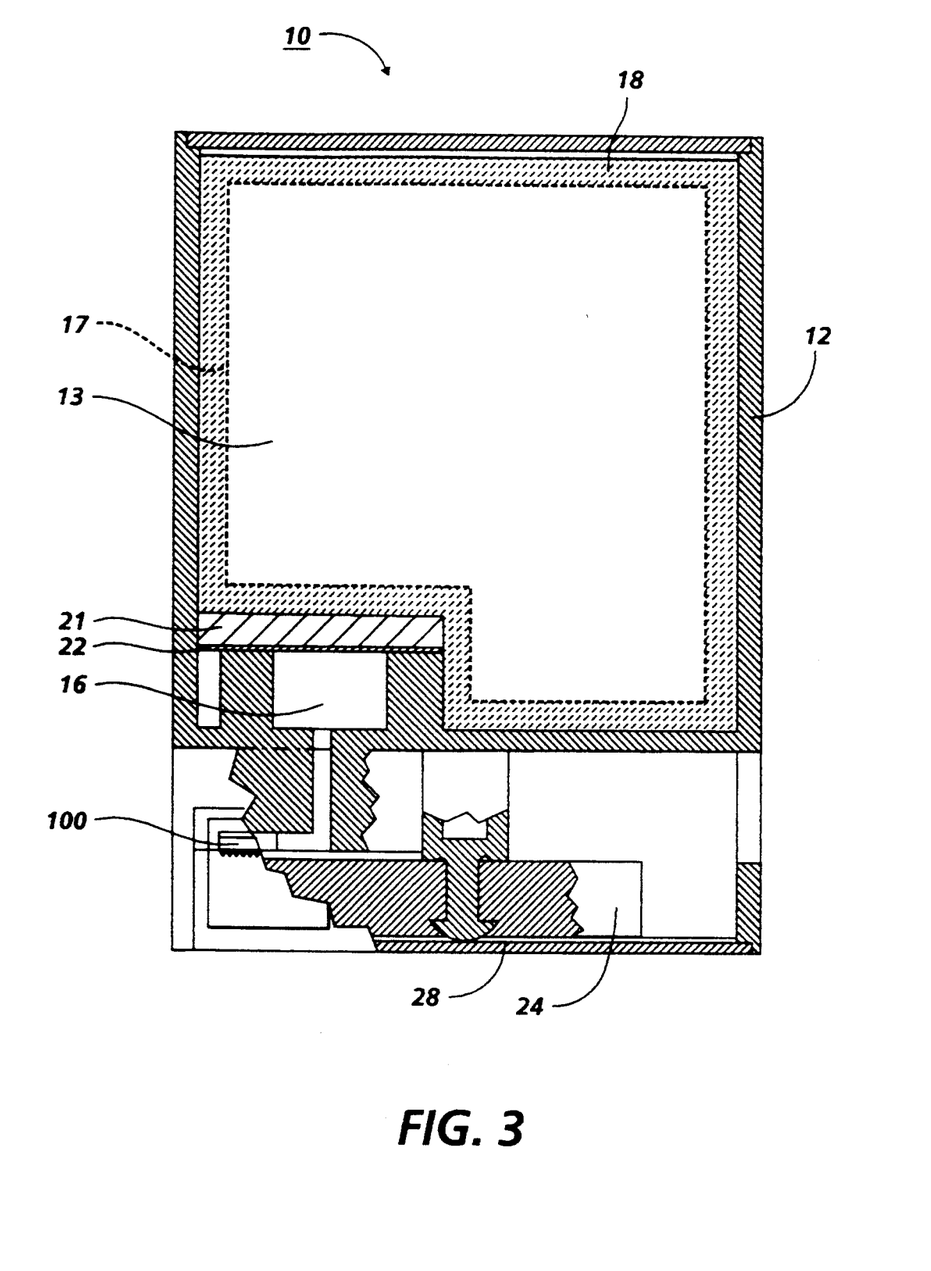

Additionally, as illustrated schematically in FIG. 3, zeolite can be incorporated into the ink cartridge by constructing the cartridge so that one or more inner walls of the cartridge is of a porous plastic or other material behind which are situated zeolite particles, wherein the pores in the plastic or other material are smaller than the diameter of the zeolite particles. As shown schematically in FIG. 3, ink cartridge 10 has a main portion in the form of a housing 12. Housing 12 is typically made of a lightweight but durable plastic. Housing 12 defines a chamber 13 for the storage of liquid ink, and an exit opening 16. At the end of the exit opening 16 (as shown at the broken portion of FIG. 3) is an ink jet printhead 100, and specifically the ink supply manifold thereof. Any suitable interior configuration of housing 12 can also be employed. Other optional parts of the cartridge 10 which are useful in a practical embodiment of the invention include a heat sink 24 and cover 28. A practical design will typically include space for on-board circuitry for selective activation of the heating elements in the printhead 100. If desired, housing 12 can be vented to the air to enhance ink flow from the cartridge. Further situated between the main storage chamber 13 and exit opening 16 is an optional filter, indicated as 21, to remove any particulate matter in the ink. Optionally, exit opening 16 can be initially covered by a seal 22. The seal is of a material easily ruptured, such as an aluminum foil seal which is adhesively attached to a periphery of the exit opening. When the seal is broken, ink can exit the storage chamber 13. At least one inner wall of housing 12 has a lining 17 a suitable porous material, such as porous plastic or the like, and situated between lining 17 and housing 12 are particles of a zeolite material 18, wherein the zeolite particles 18 are of a particle diameter larger than the diameter of the pores in lining 17.

Figure 4:
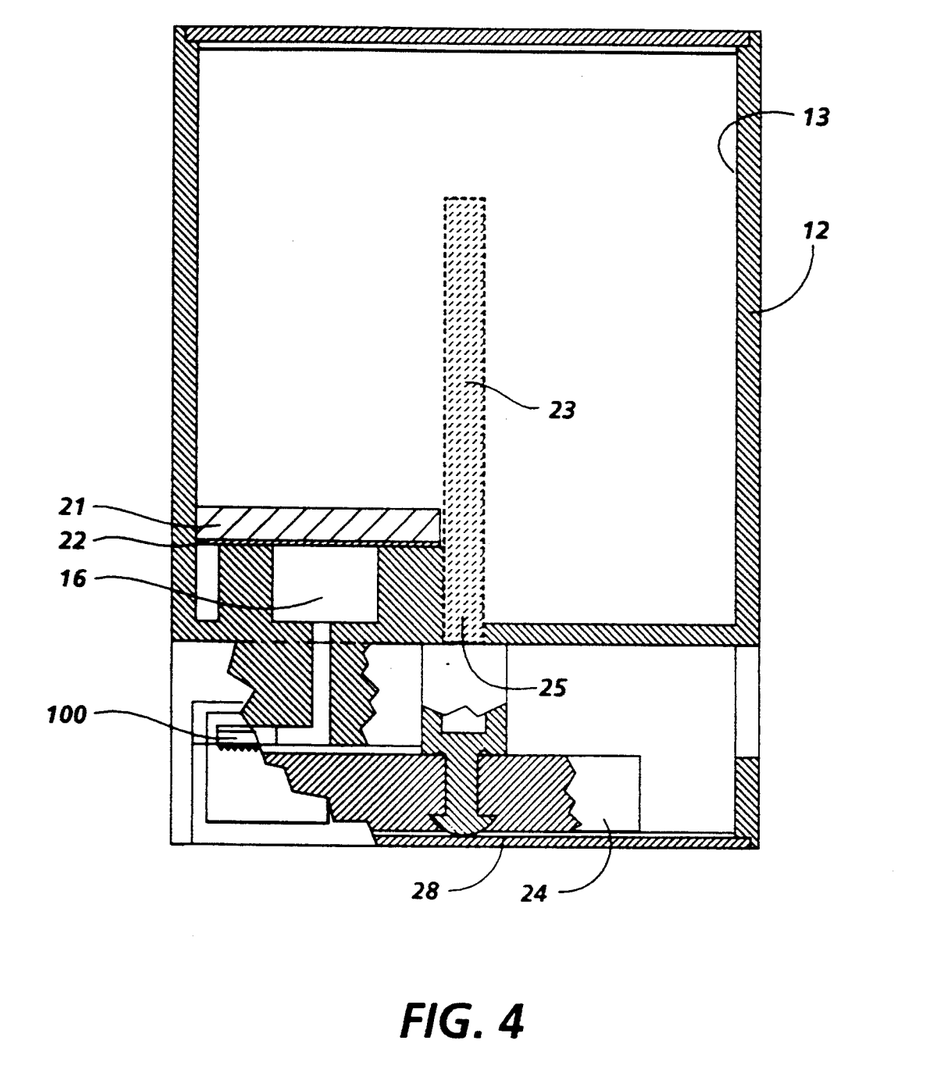

Alternatively or in addition, as illustrated schematically in Figure 4, a column can be included in the structure of the cartridge, wherein the column is of a porous plastic or other material with pores smaller than the diameter of zeolite particles contained in the column. As shown schematically in FIG. 4, ink cartridge 10 has a main portion in the form of a housing 12. Housing 12 is typically made of a lightweight but durable plastic. Housing 12 defines a chamber 13 for the storage of liquid ink, and an exit opening 16. At the end of the exit opening 16 (as shown at the broken portion of FIG. 4) is an ink jet printhead 100, and specifically the ink supply manifold thereof. Any suitable interior configuration of housing 12 can also be employed. Other optional parts of the cartridge 10 which are useful in a practical embodiment of the invention include a heat sink 24 and cover 28. A practical design will typically include space for on-board circuitry for selective activation of the heating elements in the printhead 100. If desired, housing 12 can be vented to the air to enhance ink flow from the cartridge. Further situated between the main storage chamber 13 and exit opening 16 is an optional filter, indicated as 21, to remove any particulate matter in the ink. Optionally, exit opening 16 can be initially covered by a seal 22. The seal is of a material easily ruptured, such as an aluminum foil seal which is adhesively attached to a periphery of the exit opening. When the seal is broken, ink can exit the storage chamber 13. Situated within storage chamber 13 is a column 23 of any suitable porous material, such as porous plastic or the like, in which are contained particles of a zeolite material 25, wherein the zeolite particles 25 are of a particle diameter larger than the diameter of the pores in column 23.

Any other desired configuration can also be employed

The embodiment of the present invention wherein a zeolite filter is situated in the ink container or in the ink delivery system between the ink container and the printhead also has the advantage of removing gases dissolved in the ink. Zeolites have the ability to adsorb specific gas molecules selectively, with the ability to adsorb the gas being determined in part by the size of the connecting channels within the interconnecting lattice structure of the zeolite. Specific channel sizes enable the zeolites to act as molecular gas sieves and selectively adsorb gases such as ammonia, hydrogen sulfide, carbon monoxide, carbon dioxide, sulfur dioxide, steam, oxygen, nitrogen, formaldehyde, argon, krypton, freon, helium, xenon, and the like. Problems arise with ink jet printers which are known in the art as a result of dissolved gases being present in the ink in the ink reservoir. As well as making it difficult to control the temperature of the ink, the dissolved gases can have a significant effect on the amount of ink expelled in a droplet when the ink near a channel orifice is heated, and on the manner of its expulsion, thereby reducing print quality. When a heater resistor near a channel orifice is addressed, dissolved gases in the vicinity expand and even merge with the ink vapor bubble, thereby distorting the vapor bubble, and therefore the ink droplet, from its optimum volume and shape. Also, in ink jet printers it is conventional to maintain a negative pressure at the printhead; the presence of air bubbles may make this difficult. A degree of resistance to flow of the ink may also be produced by dissolved gas bubbles, particularly when collected around filter screens so that capillary refill is impeded or blocked. These difficulties can be reduced or eliminated by the present invention.

The present invention is also directed to a process which entails incorporating an ink composition prepared by the process of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. Any suitable substrate can be employed, including plain papers such as Xerox ® 4024 papers, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments, All parts and percentages are by weight unless otherwise indicated.

EXAMPLE I

An ink composition was prepared comprising 2.5 percent by weight Direct Black 168 dye (obtained from ICI, Wilmington, Del.), 20 percent by weight ethylene glycol, 0.03 percent by weight of polyethylene oxide (obtained from Polysciences, also available from Union Carbide Corporation, Danbury, Conn.) with a molecular weight of 18,500, and 77.47 percent by weight deionized water. The ink ingredients were mixed together and stirred with a magnetic stirrer for one hour, followed by filtering through a 0.45 micron filter. Thereafter, the ink was treated for one hour by adding to the ink 0.05 percent by weight of the ink of a zeolite (TSM-140H, obtained from Steelhead Specialty Minerals, Spokane, Wash.) containing 66.03% by volume $SiO_2$, 10.47% by volume $Al_2O_3$, 1.55% by volume CaO, 0.58% by volume MgO, 0.13% by volume $TiO_2$, 3.25% by volume $Na_2O$, 1.81% by volume $K_2O$, 1.12% by volume $Fe_2O_3$, and 0.027% by volume MnO and having a total pore volume of about 15 percent. Subsequently, the ink was filtered again with a 0.80 micron filter and then incorporated into a thermal ink jet test fixture. The initial volume of the drops jetted was 86 picoliters. This drop volume remained constant for a duration of about $2.5 \times 10^7$ drops. For comparison purposes, an ink of identical composition was prepared but was not treated with the zeolite. When incorporated into the test fixture, the initial drop volume was about 91 picoliters, but this volume gradually decreased to about 38 picoliters after $1 \times 10^7$ drops.

EXAMPLE II

An ink composition was prepared comprising 35 percent by weight Projet Magenta 2 dye (obtained from ICI, Wilmington, Del., obtained as a 10 percent by weight solution of the dye), 20 percent by weight ethylene glycol, 0.03 percent by weight of polyethylene oxide (obtained from Polysciences, also available from Union Carbide Corporation, Danbury, Conn.) with a molecular weight of 18,500, and 44.97 percent by weight deionized water by simple mixing of the ingredients with a magnetic stirrer for one hour, followed by filtering the ink through a 0.45 micron filter. Thereafter, the ink was treated for 30 minutes by adding to the ink 1.5 grams of a zeolite (TSM-140H, obtained from Steelhead Specialty Minerals, Spokane, Wash.) containing 66.03% $SiO_2$, 10.47% $Al_2O_3$, 1.55% CaO, 0.58% MgO, 0.13% $TiO_2$, 3.25% $Na_2O$, 1.81% $K_2O$, 1.12% $Fe_2O_3$, and 0.027% MnO and having a total pore volume of about 15 percent. Subsequently, the ink was filtered again with a 0.80 micron filter and then incorporated into a thermal ink jet test fixture. The initial volume of the drops jetted was 71 picoliters. This drop volume exhibited no decrease for a duration of about $1 \times 10^7$ drops (and exhibited a 3.3 percent increase during this period). The latency of this ink was measured at 15 percent relative humidity and determined to be 100 seconds. For comparison purposes, an ink of identical composition was prepared but was not treated with the zeolite. When incorporated into the test fixture, the initial drop volume was reduced by about 42 percent to 43 picoliters and the latency of this ink at 15 percent relative humidity was 40 seconds,

EXAMPLE III

A

A black dye suitable for use in a thermal ink jet ink is prepared by dissolving 5 grams of ink jet grade Direct Black 168 dye (obtained from ICI, Wilmington, Del.) in 95 grams of deionized water while stirring the solution for a period of about one hour at 50° C. To the cooled dye solution is then added 0.1 gram of a zeolite (TSM-140H, obtained from Steelhead Speciality Minerals, Spokane, Wash.) containing 66.03% $SiO_2$, 10.47% $Al_2O_3$, 1.55% CaO, 0.58% MgO, 0.13% $TiO_2$, 3.25% $Na_2O$, 1.81% $K_2O$, 1.12% $Fe_2O_3$, and 0.027% MnO and with total pore volume of about 15 percent. The zeolite solution is left standing for a period of at least one hour and is then filtered with a 0.80 micron filter to yield a treated dye solution.

B

A black dye suitable for use in a thermal ink jet ink is prepared by adding at least about 0.1 grams of a zeolite (TSM-140H, obtained from Steelhead Speciality Minerals, Spokane, Wash.) containing 66.03% $SiO_2$, 10.47% $Al_2O_3$, 1.55% CaO, 0.58% MgO, 0.13% $TiO_2$, 3.25% $Na_2O$, 1.81% $K_2O$, 1.12% $Fe_2O_3$, and 0.027% MnO and with total pore volume of about 15 percent to 100 grams of Pro-Jet Black 1 dye (obtained from ICI, Wilmington, Del. as a 5 percent solution). The solution is stirred for a period of about one hour at room temperature and then filtered with a 0.80 micron filter to yield a treated dye solution.

C

A magenta dye suitable for use in a thermal ink jet ink is prepared by adding at least about 4.0 grams of a zeolite (TSM-140H, obtained from Steelhead Speciality Minerals, Spokane, Wash.) containing 66.03% $SiO_2$, 10.47% $Al_2O_3$, 1.55% CaO, 0.58% MgO, 0.13% $TiO_2$, 3.25% $Na_2O$, 1.81% $K_2O$, 1.12% $Fe_2O_3$, and 0.027% MnO and with total pore volume of about 15 percent to 100 grams of Pro-Jet Magenta 2 dye (obtained from ICI, Wilmington, Del. as a 10 percent solution). The solution is stirred for a period of about one hour at room temperature and then filtered with a 0.80 micron filter to yield a treated dye solution.

D

A magenta dye suitable for use in a thermal ink jet ink is prepared by flowing a 100 grams solution of Pro-Jet Magenta 1 dye (obtained from ICI, Wilmington, Del. as a 10 percent solution) through a column composed of a bed of a zeolite (TSM-140H, obtained from Steelhead Speciality Minerals, Spokane, Wash.) containing 66.03% $SiO_2$, 10.47% $Al_2O_3$, 1.55% CaO, 0.58% MgO, 0.13% $TiO_2$, 3.25% $Na_2O$, 1.81% $K_2O$, 1.12% $Fe_2O_3$, and 0.027% MnO and with total pore volume of about 15 percent, about 10 grams, capable of complexing up to 16.5 m.e. of cations from the dye solution. The solution is filtered with a 0.80 micron filter to yield a treated dye solution.

E

A black dye suitable for use in a thermal ink jet ink is prepared by dissolving 5 grams of ink jet grade Direct Black 168 dye (obtained from ICI, Wilmington, Del.) in 95 grams of deionized water while stirring the solution for a period of about one hour at 50° C. To the cooled dye solution is then added 1 gram of a zeolite (Cabsorb ZS500H, 20–50 mesh, processed form of the 5 Angstrom zeolite chabazite, with sodium as the primary exchangeable cation, ion exchange capacity of 2.50 meq/g, available from GSA Resources Inc., Cortaro, Ariz.). The zeolite solution is left standing for a period of at least one hour and is then filtered with a 0.80 micron filter to yield a treated dye solution.

F

A black dye suitable for use in a thermal ink jet ink is prepared by dissolving 5 grams of ink jet grade Direct Black 168 dye (obtained from ICI, Wilmington, Del.) in 95 grams of deionized water while stirring the solution for a period of about one hour at 50° C. To the cooled dye solution is then added 1 gram of a zeolite (EZA Zeolite A, with calcium as the primary exchangeable cation, ion exchange capacity of greater than 255 mg $CaCO_3$ per gram, available from Ethyl Corporation). The zeolite solution is left standing for a period of at least one hour and is then filtered with a 0.80 micron filter to yield a treated dye solution.

G

A black dye suitable for use in a thermal ink jet ink is prepared by dissolving 5 grams of ink jet grade Direct Black 168 dye (obtained from ICI, Wilmington, Del.) in 95 grams of deionized water while stirring the solution for a period of about one hour at 50° C. To the cooled dye solution is then added 1 gram of a zeolite (Valfor 100 sodium aluminosilicate, ion exchange capacity of 5.6 meq/g, available from PQ Corporation, Valley Forge, Pa.). The zeolite solution is left standing for a period of at least one hour and is then filtered with a 0.80 micron filter to yield a treated dye solution.

H

A black dye suitable for use in a thermal ink jet ink is prepared by dissolving 5 grams of ink jet grade Direct Black 168 dye (obtained from ICI, Wilmington, Del.) in 95 grams of deionized water while stirring the solution for a period of about one hour at 50° C. To the cooled dye solution is then added 2 grams of a zeolite (Cabsorb SC1502A, a magnesium calcium aluminosilicate zeolite, ion exchange capacity of 1.25 meq/g, available from GSA Resources Inc., Cortaro, Ariz.). The zeolite solution is left standing for a period of at least one hour and is then filtered with a 0.80 micron filter to yield a treated dye solution.

Thermal ink jet inks are prepared with the dye solutions obtained by admixing the dye solution with water and any other desired ink ingredients. The resulting ink is then filtered with a 0.45 or 0.80 micron filter prior to use.

Other embodiments and modifications of the present invention may occur to those skilled in the art subsequent to a review of the information presented herein, these embodiments and modifications, as well as equivalents thereof, are also included within the scope of this invention.

What is claimed is:

1. A process which comprises treating a dye with a zeolite, followed by admixing the treated dye with an aqueous liquid vehicle to form an ink composition.

2. A process according to claim 1 wherein the dye is an anionic dye.

3. A process according to claim 1 wherein particles of the zeolite are admixed with the dye, followed by removal of the zeolite particles from the dye.

4. A process according to claim 1 wherein the dye is filtered through the zeolite.

5. A process which comprises admixing a dye and an aqueous liquid vehicle to form an ink composition, followed by treating the ink composition with a zeolite.

6. A process according to claim 5 wherein the dye is an anionic dye.

7. A process according to claim 5 wherein particles of the zeolite are admixed with the ink, followed by removal of the zeolite particles from the ink.

8. A process according to claim 5 wherein the ink is filtered through the zeolite.

9. A process which comprises admixing a dye and an aqueous liquid vehicle to form an ink composition, preparing an ink container having, an exit opening and a storage area and having a zeolite filter situated between the exit opening and the storage area, incorporating the ink composition into the ink container, and causing the ink to exit from the storage area through the zeolite filter.

10. A process which comprises admixing a dye and an aqueous liquid vehicle to form an ink composition, preparing an ink container having an exit opening and a storage area and containing a zeolite material within the storage area, and incorporating the ink composition into the ink container so that the ink contacts the zeolite.

11. An ink container comprising (a) an exit opening; (b) an ink storage area; and (c) a zeolite filter situated between the exit opening and the ink storage area.

12. An ink container comprising (a) an exit opening; (b) an ink storage area; and (c) a zeolite situated within the ink storage area and area.

13. An ink container according to claim 12 wherein the zeolite is situated in a porous container situated within the ink storage area.

14. An ink container according to claim 12 wherein the zeolite is situated between a structural member of the ink storage area and a porous lining containing the zeolite.

15. An ink composition prepared according to the process of claim 1.

16. An ink composition prepared according to the process of claim 5.

17. A process which comprises incorporating an ink according to claim 15 into an ink jet printing apparatus and causing droplets of the ink composition to be ejected in an imagewise pattern onto a substrate.

18. A process according to claim 17 wherein the printing apparatus employs a thermal ink jet process, wherein the ink in the nozzles is selectively heated in an imagewise pattern, thereby causing droplets of the ink to be ejected in imagewise pattern.

19. A process which comprises incorporating an ink according to claim 16 into an ink jet printing apparatus and causing droplets of the ink composition to be ejected in an imagewise pattern onto a substrate.

20. A process according to claim 19 wherein the printing apparatus employs a thermal ink jet process, wherein the ink in the nozzles is selectively heated in an imagewise pattern, thereby causing droplets of the ink to be ejected in imagewise pattern.

* * * * *